US011175928B2

(12) United States Patent
Deng

(10) Patent No.: US 11,175,928 B2
(45) Date of Patent: Nov. 16, 2021

(54) MASTER-SLAVE CONFIGURATION COMMUNICATION PROTOCOL, METHOD FOR IMPROVING COMPATIBILITY, AND ELECTRONIC DEVICE

(71) Applicant: WUXI RUIQIN TECHNOLOGY CO., LTD, Wuxi (CN)

(72) Inventor: Jun Deng, Wuxi (CN)

(73) Assignee: WUXI RUIQIN TECHNOLOGY CO., LTD, Wuxi (CN)

( * ) Notice: Subject to any disclaimer, the term of this patent is extended or adjusted under 35 U.S.C. 154(b) by 0 days.

(21) Appl. No.: 17/042,896

(22) PCT Filed: Dec. 11, 2018

(86) PCT No.: PCT/CN2018/120263
§ 371 (c)(1),
(2) Date: Sep. 28, 2020

(87) PCT Pub. No.: WO2019/184444
PCT Pub. Date: Oct. 3, 2019

(65) Prior Publication Data
US 2021/0055939 A1    Feb. 25, 2021

(30) Foreign Application Priority Data

Mar. 30, 2018  (CN) .......................... 201810291971.4

(51) Int. Cl.
*G06F 9/445*    (2018.01)
*G06F 1/10*     (2006.01)
(Continued)

(52) U.S. Cl.
CPC ............ *G06F 9/44505* (2013.01); *G06F 1/10* (2013.01); *G06F 13/20* (2013.01)

(58) Field of Classification Search
CPC ........ G06F 9/44505; G06F 1/10; G06F 13/20; G06F 13/4282; G06F 13/387; G06F 13/4221
(Continued)

(56) References Cited

U.S. PATENT DOCUMENTS 10,649,945 B1 *   5/2020  Geerling ............. G06F 13/4068
2009/0006607 A1 * 1/2009  Bu ........................ H04L 45/745
                                                        709/224
(Continued)

FOREIGN PATENT DOCUMENTS

| CN | 104571948 | 4/2015 |
| CN | 106598887 | 4/2017 |
| CN | 108664429 | 10/2018 |

OTHER PUBLICATIONS

English Translation of International Search Report for International application No. PCT/CN2018/120263 dated Feb. 28, 2019.
(Continued)

*Primary Examiner* — Idriss N Alrobaye
*Assistant Examiner* — Henry W Yu
(74) *Attorney, Agent, or Firm* — The PL Law Group, PLLC

(57) ABSTRACT

The present invention relates to the technical field of electronic communication, and specifically disclosed thereby are a master-slave configuration communication protocol, a method for improving compatibility and an electronic device. The master-slave configuration communication protocol comprises: electrically connecting one GPIO pin of a master configuration to at least one kind of slave configuration; the master configuration sending a mock address to the slave configuration through the GPIO pin; and the slave configuration receiving the mock address and comparing the mock address with its native address, if the mock address matches the native address, the slave configuration sends its (Continued)

parameter information to the master configuration. The master-slave configuration communication protocol provided by embodiments of the present invention may enable the master configuration to obtain parameter information of one or more kinds of slave configurations connected to the master configuration through one GPIO pin, so that the master configuration is allowed to be compatible with multiple slave configurations, and thus the GPIO pin resources are greatly saved. The present invention also provides a method for improving compatibility and an electronic device.

15 Claims, 4 Drawing Sheets

(51) Int. Cl.
　　*G06F 13/20* (2006.01)
　　*G06F 13/42* (2006.01)
　　*G06F 13/38* (2006.01)
(58) Field of Classification Search
　　USPC .............................. 710/3, 10, 62, 104, 110
　　See application file for complete search history.

(56) References Cited

U.S. PATENT DOCUMENTS

| | | | |
|---|---|---|---|
| 2009/0022160 A1* | 1/2009 | Eberle | H04L 47/50 370/395.4 |
| 2011/0016310 A1* | 1/2011 | Yong | G06F 21/85 713/155 |
| 2011/0161468 A1* | 6/2011 | Tuckey | H04L 41/0803 709/220 |
| 2015/0242201 A1 | 8/2015 | Kim et al. | |
| 2016/0034416 A1* | 2/2016 | Chavez | G06F 13/4282 381/59 |
| 2017/0244923 A1* | 8/2017 | Son | G06F 7/74 |
| 2018/0196679 A1* | 7/2018 | Sun | G06F 9/4403 |

OTHER PUBLICATIONS

English Translation of Written Opinion for International application No. PCT/CN2018/120263 dated Oct. 31, 2019.
International Search Report for International application No. PCT/CN2018/120263 dated Feb. 28, 2019.
Written Opinion for International application No. PCT/CN2018/120263 dated Oct. 31, 2019.
First Office Action from for China Patent Application No. 201810291971.4.
Second Office Action for China Patent Application No. 201810291971.4.
English Translation of First Office Action from for China Patent Application No. 201810291971.4 dated Aug. 30, 2019.
English Translation of Second Office Action for China Patent Application No. 201810291971.4 dated Mar. 23, 2020.

* cited by examiner

MASTER-SLAVE CONFIGURATION COMMUNICATION PROTOCOL, METHOD FOR IMPROVING COMPATIBILITY, AND ELECTRONIC DEVICE

CROSS-REFERENCE TO RELATED APPLICATIONS

This application is a national phase filing under 35 U.S.C. § 371 of PCT International Application PCT/CN2018/120263, filed Dec. 11, 2018, and published under PCT Article 21(2) in Chinese as WO/2019/184444 on Oct. 3, 2019. PCT/CN2018/120263 claimed priority benefit of China Patent Application No. 201810291971.4 filed Mar. 30, 2018. The above identified applications are hereby incorporated by reference in their entirety.

TECHNICAL FIELD

The present invention relates to the field of electronic communications technologies, and in particular to a master-slave configuration communication protocol, a method for improving compatibility and an electronic device.

BACKGROUND

Configurations refer to hardware components of an electronic product. For example, configurations of a computer mainly include a CPU, a motherboard, memories, a hard disk, a graphics card, a sound card, a network card, a case, a power supply, a heat sink, and external devices such as a display, an optical driver, a keyboard, a mouse, and a loudspeaker. The higher the relevant configurations are, the better the overall performance of the computer is. For realizing information exchange between different configurations, a corresponding communication protocol is required.

Chinese Patent CN106598887 describes a method for being compatible with different hardware according to GPIO (General Purpose Input/Output, GPIO for short) pin information. The technical solution mentioned above can distinguish various hardware configurations, but it will waste GPIO resource seriously. For example, if there are three memory manufacturers A, B, and C and five hard disk manufacturers A, B, C, D, and E, the memory and the hard disk cannot share GPIO pins according to the communication protocol recited in the above patent, and furthermore, the memory needs at least 2 GPIO pins and the hard disk needs at least 3 GPIO pins. For some processors with fewer GPIO pins, there are serious deficiencies in the numbers of GPIO pins.

SUMMARY

An object of the present invention is to provide a master-slave configuration communication protocol, which allows a master configuration to obtain parameter information of one or more kinds of slave configurations connected to it through one GPIO pin.

Another object of the invention is to provide a method for improving compatibility, which allows a master configuration to be compatible with various kinds of slave configurations requiring different initialization codes.

A further object of the invention is to provide an electronic device of which a master configuration is compatible with various kinds of slave configurations requiring different initialization codes.

In order to achieve one or more objects of the present invention, the invention adopts the following technical solutions.

In an aspect, a master-slave configuration communication protocol is provided, which comprises:

electrically connecting one GPIO pin of a master configuration to at least one kind of slave configuration:

the master configuration sending a mock address to the slave configuration through the GPIO pin; and said slave configuration receiving said mock address and comparing said mock address with its native address: if the mock address matches the native address, the slave configuration sends its parameter information to the master configuration.

Preferably, before the master configuration sends the mock address to the slave configuration through the GPIO pin, the communication protocol further comprises:

the master configuration pulling a signal line down from an initial high level for (R+Y) clock cycles as a ready-to-send marker;

the master configuration pulling a signal line up from an initial low level for (R+Y) clock cycles as a ready-to-send marker; and wherein R and Y are both positive integers.

Preferably, the value of R is related to the number N of the kinds of the slave configurations (3), and a relationship between R and N is as follows:

$$R=L(\log_2 N)+1;$$

wherein $L(\log_2 N)$ represents a minimum integer greater than or equal to $\log_2 N$; and the value of Y is related to a maximum value X of manufacturer quantities of various kinds of slave configurations, and a relationship between Y and X is as follows:

$$Y=L(\log_2 X)+1;$$

wherein $L(\log_2 X)$ represents a minimum integer greater than or equal to $\log_2 X$.

Preferably, data bits of the mock address are (R−1) bits.

Preferably, before the slave configuration sends its parameter information to the master configuration, the communication protocol further comprises:

the slave configuration sending R bits of 0 or 1 to the master configuration as a ready-to-feedback marker.

Preferably, before the master configuration pulls the signal line down from the initial high level for (R+Y) clock cycles as the ready-to-send marker, the communication protocol further comprises: the master configuration setting the GPIO pin to an output state and making it to output a high level; or before the master configuration pulls the signal line up from the initial low level for (R+Y) clock cycles as the ready-to-send marker, the communication protocol further comprises: the master configuration setting the GPIO pin to an output state and making it to output a low level.

Preferably, the parameter information is a manufacturer ID number.

Preferably, data bits of the manufacturer ID number have V bits, and the value of V is related to manufacturer quantity S of this kind of slave configuration, and a relationship between V and S is as follows: $V=L(\log_2 S)$; wherein $L(\log_2 S)$ represents a minimum integer greater than or equal to $\log_2 S$.

In another aspect, a method for improving compatibility is provided, which comprises:

presetting a plurality of sets of initialization codes in software, wherein each set of initialization codes corresponds to one kind of slave configuration of at least one manufacturer;

obtaining parameter information of each kind of slave configuration through the master-slave configuration communication protocol according to any one of previous claims; and calling corresponding initialization code in the software according to the parameter information.

In yet another aspect, an electronic device is provided, which comprises:

a master configuration having at least one GPIO pin; and at least one kind of slave configuration, each of which is electrically connected to one and the same of said GPIO pin, and wherein the master configuration calls initialization code corresponding to said slave configuration by the above-mentioned method for improving compatibility.

The beneficial effects of the present invention are in that: according to the master-slave configuration communication protocol, the method for improving compatibility and the electronic device provided by the embodiments of the present invention, a master configuration is capable of obtaining parameter information of one or more kinds of slave configurations connected to it through one GPIO pin. No matter how many kinds of slave configurations there are and how many manufacturers are there for each kind of slave configuration, the slave configuration can be discerned through the same one GPIO pin. In this way, multiple hardware configurations can be compatible with a same version of software, which not only greatly saves GPIO pin resources, but also reduces the cost and risk of software version management and control.

BRIEF DESCRIPTION OF THE DRAWINGS

In order to more clearly describe embodiments of the present invention or the technical solutions in the prior art, the following will briefly describe the drawings used in the description of embodiments or the prior art. However, it is obvious that the drawings in the following description are only some embodiments of the present invention, and for those skilled in the art, other drawings can be obtained according to the drawings without inventive work.

Figure 1:
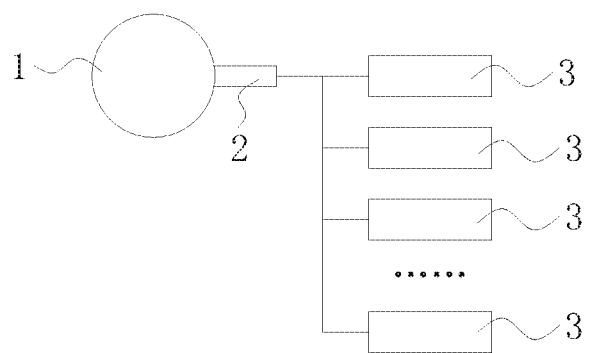
FIG. 1 is a schematic diagram of connections between a master configuration and slave configurations according to the first embodiment of the present invention.

In the drawings:
1. master configuration;
2. GPIO pin; and
3. slave configuration(s).

DETAILED DESCRIPTION

In order to make the objects, features and advantages of the present invention more obvious and easy to understand, the technical solutions in the embodiments of the present invention will be clearly and completely described below with reference to the accompanying drawings in the embodiments of the present invention, and it is obvious that the embodiments described below are only a part of the embodiments of the present invention, rather than all the embodiments. All other embodiments, which can be obtained by a person skilled in the art without making any inventive work based on the embodiments in the present invention, fall into the protection scope of the present invention.

The technical solutions of the present invention are further explained with reference to the accompanying drawings and in combination with the implementations.

In the description of the present invention, it should be noted that the terms "front", "back", "left", "right", "top", "bottom", etc. indicate orientations or positional relationships based on the orientations or positional relationships shown in FIG. 1, and they are only for convenience of describing the present invention and simplifying the description, but do not indicate or imply that the device or element referred to must have a specific orientation or be constructed and operated in a specific orientation, and thus, they should not be construed as limiting the present invention.

First Embodiment

Figure 2:
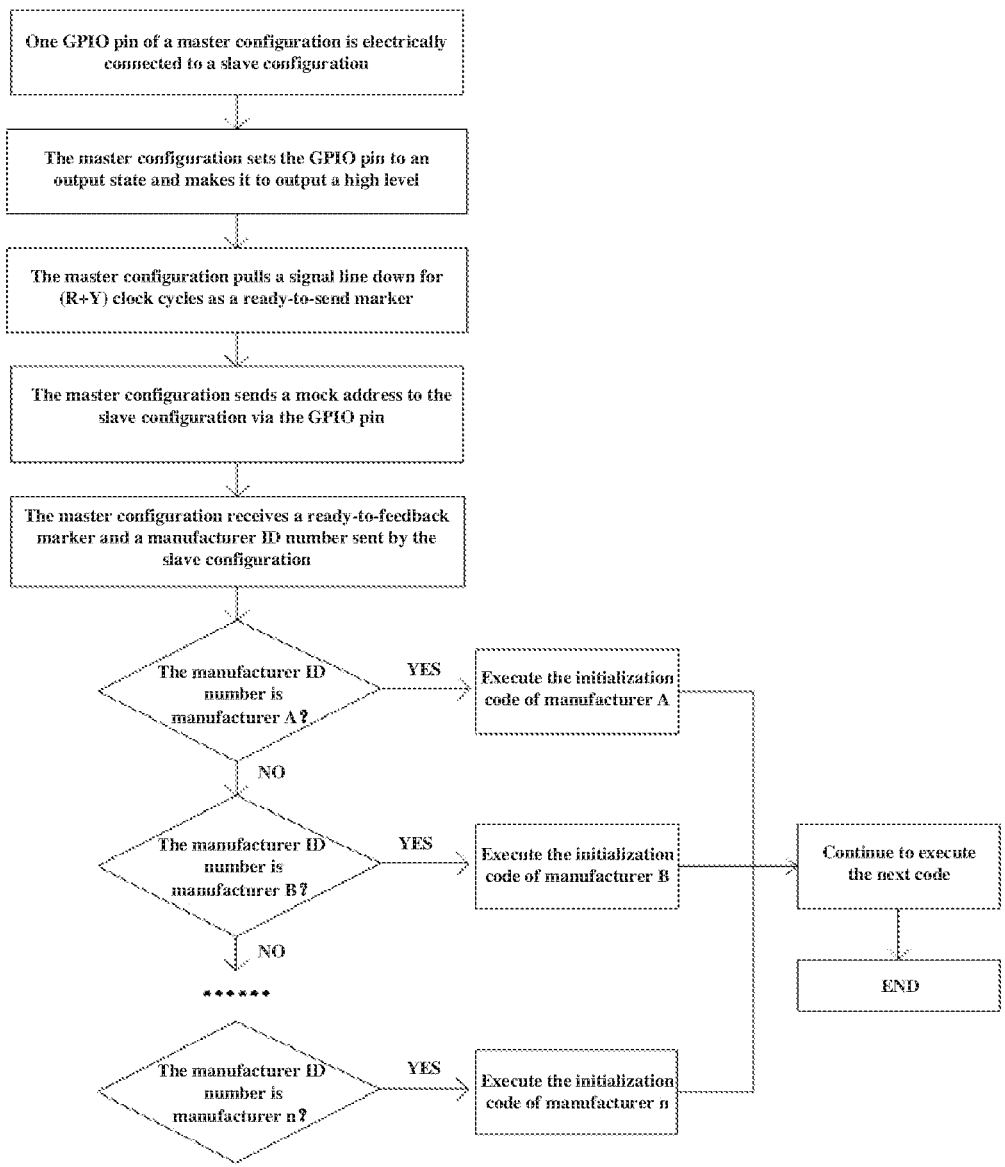
FIG. 2 is a flowchart of the master configuration according to the first embodiment of the present invention.
Figure 3:
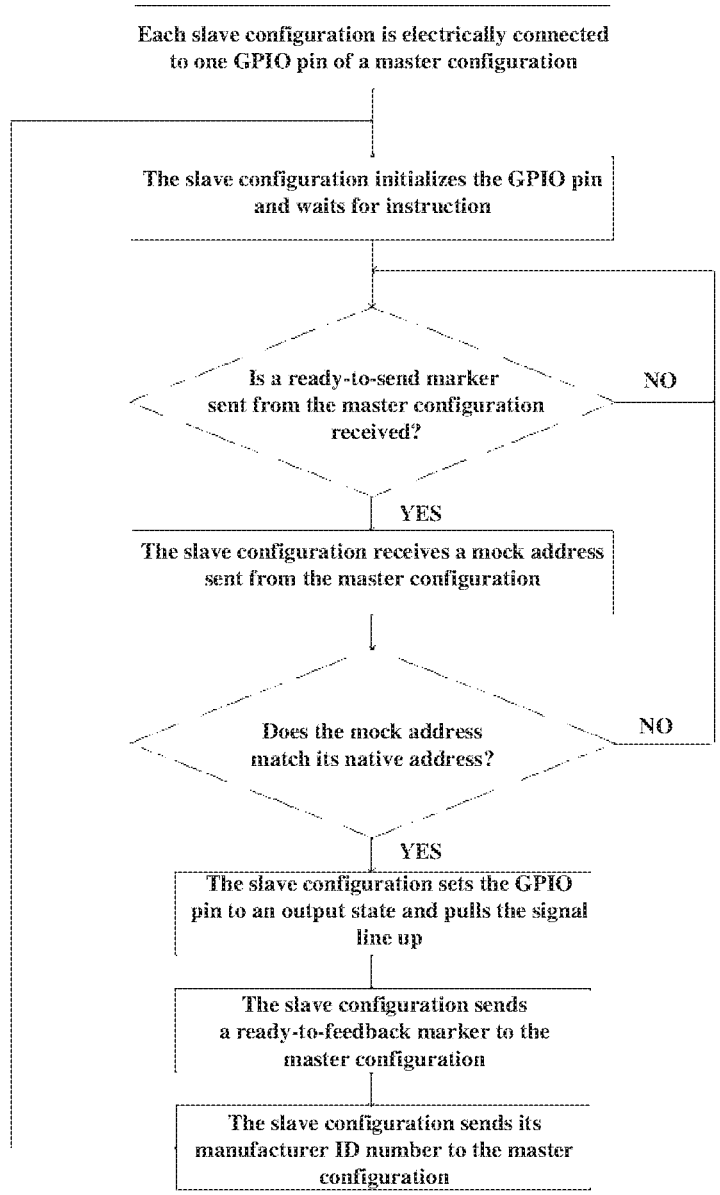
FIG. 3 is a flowchart of the slave configuration according to the first embodiment of the present invention.

As shown in FIGS. 1 to 3, this embodiment provides a master-slave configuration communication protocol, which comprises the following steps.

S10: One GPIO pin 2 of a master configuration 1 is electrically connected to at least one kind of slave configuration 3.

Specifically, in this embodiment, the master configuration 1 is a processor having at least one GPIO pin 2, and the number of the kinds of the slave configurations 3 is three, which are respectively a memory, a hard disk, and a graphics card. Among these, the memory may be provided by a manufacturer A or a manufacturer B, the hard disk may be provided by a manufacturer C, a manufacturer D or a manufacturer E, and the graphics card may be provided by a manufacturer F or a manufacturer G. As shown in FIG. 1, the slave configurations 3 such as the memory, the hard disk, the graphics card and the like are all connected to one GPIO pin 2 of the processor through wires and the like. In this embodiment, the processor may be a general single chip microcomputer, an ARM (Advanced RISC Machines, ARM for short) processor, a DSP (Digital Signal Processing, DSP for short) processor, or an Intel CPU and the like.

S20: The master configuration 1 sets the GPIO pin 2 to an output state and makes it to output a high level.

Specifically, in an initial state, a signal line is initialized to be pulled up, and the processor sets the GPIO pin 2 for communication to an output state and makes the GPIO pin 2 to output a high level.

S30: the master configuration 1 pulls the signal line down from the initial high level for (R+Y) clock cycles as a ready-to-send marker. Preferably, R and Y are both positive integers.

Specifically, when detection begins, the processor pulls the high level signal down for (R+Y) clock cycles, and the slave configurations 3 such as the memory and the like detect the change of the level signal and enter into a preparation state to be ready for receiving a mock address. Preferably, the master configuration 1 pulling the signal line down for (R+Y) clock cycles from the initial high level may be implemented by the processor sending binary values 0 of (R+Y) bits to the slave configurations 3 via the GPIO pin 2.

In this embodiment, R may be a positive integer related to the number N of the kinds of the slave configurations 3 to avoid false response, and further, the relationship between R and N may be defined as follows:

$$R = L(\log_2 N) + 1$$

wherein $L(\log_2 N)$ represents a minimum integer greater than or equal to $\log_2 N$, such as $L(2)=2$, $L(2.1)=3$.

In this embodiment, the slave configurations 3 include the memory, the hard disk, and the graphics card, and thus N is equal to 3, and $R = L(\log_2 3) + 1 = 3$.

In this embodiment, the value of Y is related to a maximum value X of manufacturer quantities for various kinds of slave configurations, and the relationship between Y and X is as follows:

$$Y = L(\log_2 X) + 1;$$

wherein:

X is a maximum value of manufacturer quantities for various kinds of slave configurations 3. For example, if there are 2 memory manufacturers, 3 hard disk manufacturers, and 2 graphics card manufacturers, then X=3;

$L(\log_2 X)$ represents a minimum integer greater than or equal to $\log_2 X$.

S40: the master configuration 1 sends a mock address to the slave configuration(s) 3 via the GPIO pin 2.

Specifically, the processor sends the mock address to the memory, the hard disk, and the graphics card. The mock address may be input into the processor in advance. For example, for the electronic product in this embodiment, a programmer knows that the processor generally needs to be connected to a memory, a hard disk and a graphics card according to past experience, so mock addresses of a memory, a hard disk and a graphics card are implanted into the processor in advance. For another example, for a mobile phone, the programmer knows that a processor of the mobile phone generally needs to be connected to a flash memory, a screen and a camera according to past experience, so mock addresses of a flash memory, a screen and a camera can be implanted into the processor in advance.

Preferably, the data bits of the mock address can also be related to the number of the kinds of the salve configurations 3, which are (R−1) bits.

S50: the salve configuration 3 receives the mock address and compares the mock address with its native address.

If the mock address matches the native address, the salve configuration 3 sends 0 (or 1) of R bits to the master configuration 1 as a ready-to-feedback marker, and then the slave configuration 3 sends its parameter information such as the manufacturer ID number to the master configuration 1; if not, the mock address information sent from the master configuration 1 is ignored.

Specifically, in this embodiment, if the processor sends a mock address of the memory, the memory receives the mock address and compares it with its native address. If the mock address matches the native address, the memory changes the input/output state of the GPIO pin 2, pulls the signal line up and sends 0 of R bits to the processor as a start marker (of course, it is also possible to pull the signal line down and send 1 of R bits to the processor as a start marker), and then sends the manufacturer ID number of the manufacturer A or the manufacturer B to the processor, so that the processor knows relevant information of the memory, so as to call relevant initialization code subsequently. If the processor sends a mock address of the hard disk, the memory receives the mock address and compares it with its native address. If not matching, the memory ignores the mock address, and then the hard disk receives the mock address. The hard disk compares the mock address with its native address after receiving the mock address, and if matching, the hard disk changes the input/output state of the GPIO pin 2, sends 0 (or 1) of R bits to the processor as a start marker, and then sends the manufacturer ID number of the manufacturer C, the manufacturer D or the manufacturer E to the processor. Thus, the processor knows the relevant information of the hard disk so as to call corresponding initialization code subsequently. Analogously, the address matching process of the graphics card is similar to the above process, and it is not described again. In this embodiment, the information returned from the salve configuration 3 may be a manufacturer ID number, or may be other information for distinguishing the salve configuration 3.

Preferably, the data bits of the manufacturer ID number may have V bits, and the value of V is related to manufacturer quantity S of the kind of salve configuration 3, and the relationship is as follows:

$$V = L(\log_2 S)$$

Similarly, $L(\log_2 S)$ represents a minimum integer greater than or equal to $\log_2 S$.

Specifically, the memory may be provided by the manufacturer A or the manufacturer B, thus S of the memory=2; the hard disk may be provided by the manufacturer C, the manufacturer D or the manufacturer E, thus S of the hard disk=3; the graphics card may be provided by the manufacturer F or the manufacturer G, and thus S of the graphics card=2.

Further, the processor, as the master configuration 1, analyzes the received data of V bits to identify the manufacturer of each slave configuration 3.

S60: after the master configuration 1 receives the parameter information such as the manufacturer ID number and the like, the master configuration 1 sets the GPIO pin 2 to be in an output state, and the slave configuration 3 sets the GPIO pin to be in an input state. S20-S50 are repeatedly executed until the parameter information such as the manufacturer ID number and the like of all the slave configurations is detected.

Specifically, through the master-slave configuration communication protocol provided in this embodiment, the master configuration 1 can obtain parameter information of one or more kinds of slave configurations 3 connected thereto through only one GPIO pin 2, so that various kinds of slave configurations 3 can be distinguished, and thus the GPIO pin 2 resource are greatly saved.

Second Embodiment

This embodiment also provides a master-slave configuration communication protocol, which comprises the following steps.

S10: one GPIO pin of a master configuration is electrically connected to at least one kind of slave configuration.

S20: the master configuration sets the GPIO pin to an output state and makes it to output a low level.

Specifically, in an initial state, a signal line is initialized to be pulled down, and the processor sets the GPIO pin for communication to an output state and makes the GPIO pin to output a low level.

S30: the master configuration pulls the signal line up from the initial low level for (R+Y) clock cycles as a ready-to-send marker.

Specifically, when detection begins, the processor pulls the low level signal up for (R+Y) clock cycles, and the salve configurations such as the memory and the like detect the change of the level signal and enter into a preparation state to be ready for receiving a mock address. Preferably, the master configuration pulling the signal line up from the initial low level for (R+Y) clock cycles may be implemented by the processor sending a binary value 1 of (R+Y) bits to the slave configurations via the GPIO pin. In this embodiment, the definitions of R and Y are the same as those in the first embodiment.

S40: the master configuration sends a mock address to the slave configuration(s) via the GPIO pin.

Preferably, the data bits of the mock address can also be related to the number of the kinds of slave configurations, which are (R−1) bits.

S50: the salve configuration receives the mock address and compares the mock address with its native address.

if the mock address matches the native address, then the signal line is pulled up (or pulled down), and the slave configuration sends 0 (or 1) of R bits to the master configuration as a ready-to-feedback marker, and then the salve configuration sends parameter information such as the manufacturer ID number of itself to the master configuration; and if not, the slave configuration ignores the mock address information sent from the master configuration.

S60: after the master configuration receives the parameter information such as the manufacturer ID number and the like, the master configuration sets the GPIO pin to an output state, and the slave configuration sets the GPIO pin to an input state. S20-S50 are repeatedly executed until the parameter information such as the manufacturer ID number and the like of all the slave configurations is detected.

Specifically, through the master-slave configuration communication protocol provided by this embodiment, the master configuration can obtain parameter information of one or more kinds of slave configurations connected thereto through only one GPIO pin, so that various kinds of slave configurations can be distinguished, and thus the GPIO pin resource are greatly saved.

Third Embodiment

Based on the master-slave configuration communication protocol provided by the first embodiment, the present embodiment provides a method for improving compatibility, comprising:

A1: a plurality of sets of initialization codes are preset in software, and each set of initialization codes corresponds to one kind of slave configuration of at least one manufacturer.

Specifically, initialization codes required by memories of manufacturer A, manufacturer B and other common memory manufacturers can be integrated into software in advance, initialization codes required by hard disks of a plurality of common hard disk manufacturers such as manufacturer C, manufacturer D and manufacturer E are also integrated into the software, and initialization codes required by graphics cards of a plurality of common graphics card manufacturers such as manufacturer F and manufacturer G and initialization codes of other common manufacturers of other common slave configurations are also integrated into the software, which make the software a code library containing initialization codes of a plurality of manufacturers of a plurality kinds of slave configurations. With reference to the first embodiment, the software of this embodiment includes at least initialization codes of the manufacturer A, manufacturer B, manufacturer C, manufacturer D, manufacturer E, manufacturer F, and manufacturer G, and may also include initialization codes of other manufacturers.

A2: through the communication protocol provided by the first embodiment, the master configuration obtains key parameter information such as the manufacturer ID number of each kind of slave configuration.

Specifically, the processor obtains the manufacturer ID number of the manufacturer A or the manufacturer ID number of the manufacturer B of the memory, obtains the manufacturer ID number of the manufacturer C, the manufacturer ID number of the manufacturer D or the manufacturer ID number of the manufacturer E of the hard disk, and obtains the manufacturer ID number of the manufacturer F or the manufacturer ID number of the manufacturer G of the graphics card.

A3: corresponding initialization codes are called from the software according to the parameter information obtained in the step S20.

Specifically, according to the obtained manufacturer ID number of the manufacturer A, the manufacturer B, the manufacturer C, the manufacturer D, the manufacturer E, the manufacturer F or the manufacturer G, corresponding initialization codes of the manufacturer A, the manufacturer B, the manufacturer C, the manufacturer D, the manufacturer E, the manufacturer F or the manufacturer G are called from the software. In this way, the master configuration can be compatible with various kinds of slave configurations through one piece of software, and only one GPIO pin is used as a communication pin, so that the GPIO pin resources are greatly saved.

Forth Embodiment

Based on the method for improving compatibility provided in the third embodiment, the present embodiment provides an electronic device, which comprises:

a master configuration having at least one GPIO pin;

at least one kind of slave configuration, each of which is electrically connected to one and the same of the GPIO pin, wherein the master configuration obtains information such as a manufacturer ID number of the slave configuration through the communication protocol of the first embodiment; and the master configuration calls initialization code corresponding to the slave configuration through the method provided by the second embodiment, so that the master configuration is compatible with the slave configuration.

Taking an electronic device having two kinds of slave configurations (memory and hard disk) as an example, the memory can be provided by three manufacturers (A, B, C), and the hard disk can be provided by two manufacturers (D, E). The identification process of the three manufacturers of the memory is performed as below.

(1) The master configuration initializes a GPIO pin through which it communicates with the slave configuration to be in an output state and makes it to output a high level; the master configuration outputs a low level of R+Y=L($\log_2$ N)+1+L($\log_2$ X)+1=L($\log_2$ 2)+1+L($\log_2$ 3)+1=5 clock cycles, i.e., outputting a binary number b'00000.

(2) The master configuration continues to send out a mock address of (R−1)=1 bit, and in this embodiment, the mock address of the memory is predefined as b'0, and the mock address of the hard disk is predefined as b'1. The master configuration sends out b'0 in this step.

Figure 4:
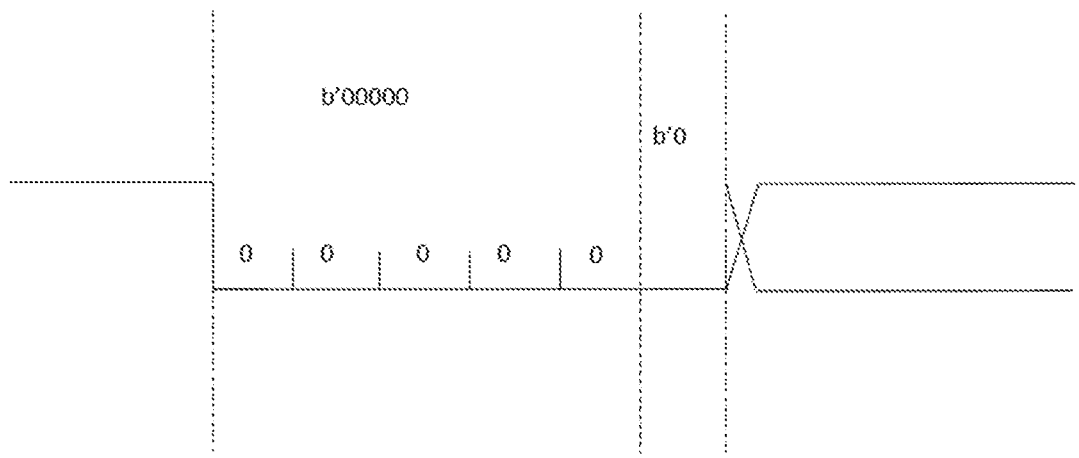
FIG. 4 is a schematic diagram of data before the master configuration receives a ready-to-feedback marker according to the fourth embodiment of the present invention.

(3) The GPIO pin is set to be in an input state. The schematic diagrams of the data in the steps (1)-(3) are shown in FIG. 4.

(4) Upon the memory and the hard disk receiving the ready-to-send marker b'00000, the memory and the hard disk start to wait for the transmission of the address. When an address b'0 is received, the hard disk detects that the address does not match its native address, and then the hard disk discards the data and continuously waits the arrival of a ready-to-send marker b'00. When the memory detects that the address matches its native address, the memory sets the GPIO pin as an output pin, pulls the signal line up, and outputs a ready-to-feedback marker, the length of which is R=2 bits, that is b'00.

Figure 5:
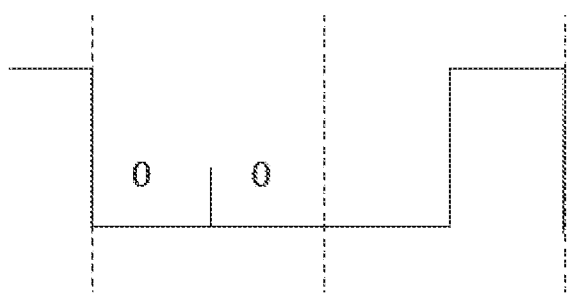
FIG. 5 is a schematic diagram of data after the slave configuration receives a ready-to-send marker according to the fourth embodiment of the present invention.

(5) When there are three memory manufacturers A, B and C, the length V for the manufacturer ID number equals V=L(log₂ S)=L(log₂ 3)=2, and the manufacturer ID numbers are assumed to be b'00, b'01, and b'10, respectively. In this embodiment, the manufacturer B is taken as an example, and if a memory provided by the manufacturer B is connected to the hardware circuitry, then the memory returns b'01. The schematic diagrams of the data in the steps (4)-(5) are shown in FIG. 5.

(6) After the slave configuration sends the data of the manufacturer ID number, the GPIO pin is set to an input state (i.e., the initial state). After the master configuration receives the ready-to-feedback marker b'00, it starts to process the next received data b'01, that is, identifying that a module used by the memory is provided by the manufacturer B, then the GPIO pin is set to be in an output state, and the signal line is pulled up and restored to the initial state.

(7) Then, the initialization code of the manufacturer B is called from the software containing various initialization codes. Similarly, if modules connected to the hardware circuitry are provided by the manufacturers A and C, initialization codes of the manufacturers A and C can be identified and executed in the same way.

(8) Similarly, when the hard disk is to be identified, b'1 is sent at the starting address. If a module provided by the manufacturer D is connected to the hardware circuitry, b'0 is received, and if a module provided by the manufacturer E is connected to the hardware circuitry, b'1 is received, and then corresponding initialization code may be called.

The above embodiments are only intended to illustrate the technical solution of the present invention and not to limit it. Although the present invention has been described in detail with reference to the above embodiments, it should be understood by those of ordinary skill in the art that the technical solutions described in the above embodiments may still be modified, or some technical features may be equivalently substituted; and such modifications or substitutions do not depart from the spirit and scope of the corresponding technical solutions of the embodiments of the present invention.

What is claimed is:

1. A master-slave configuration communication method, comprising:
   electrically connecting one General Purpose Input/Output (GPIO) pin (2) of a master configuration (1) to at least one kind of slave configuration (3);
   the master configuration (1) pulling a signal line down from an initial high level for (R+Y) clock cycles as a ready-to-send marker; or, the master configuration (1) pulling a signal line up from an initial low level for (R+Y) clock cycles as a ready-to-send marker, wherein R and Y are both positive integers,
   wherein the value of R is related to a number N of the kinds of the slave configurations (3), and a relationship between R and N is as follows:

$R=L(\log_2 N)+1;$ wherein $L(\log_2 N)$ represents a minimum integer greater than or equal to $\log_2 N$, and
   wherein the value of Y is related to a maximum value X of manufacturer quantities of various kinds of the slave configurations, and a relationship between Y and X is as follows:

$Y=L(\log_2 X)+1;$ wherein $L(\log_2 X)$ represents a minimum integer greater than or equal to $\log_2 X$;
   said master configuration (1) sending a mock address to the slave configuration (3) through the GPIO pin (2); and
   said slave configuration (3) receiving said mock address and comparing said mock address with its native address, and if the mock address matches the native address, the slave configuration (3) sends its parameter information to the master configuration (1).

2. The master-slave configuration communication method according to claim 1, wherein data bits of the mock address are (R−1) bits.

3. The master-slave configuration communication method according to claim 1, wherein before the slave configuration (3) sends its parameter information to the master configuration (1), the communication method further comprises:
   the slave configuration (3) sending R bits of 0 or 1 to the master configuration (1) as a ready-to-feedback marker.

4. The master-slave configuration communication method according to claim 1, wherein
   before the master configuration (1) pulls the signal line down from the initial high level for (R+Y) clock cycles as the ready-to-send marker, the communication method further comprises: the master configuration (1) setting the GPIO pin (2) to an output state and making it to output a high level; or
   before the master configuration (1) pulls the signal line up from the initial low level for (R+Y) clock cycles as the ready-to-send marker, the communication method further comprises: the master configuration (1) setting the GPIO pin (2) to an output state and making it to output a low level.

5. The master-slave configuration communication method according to claim 1, wherein the parameter information is a manufacturer ID number.

6. The master-slave configuration communication method according to claim 5, wherein data bits of said manufacturer ID number have V bits, and the value of V is related to manufacturer quantity S of this kind of slave configuration (3), and a relationship between V and S is as follows:

$V=L(\log_2 S);$ wherein $L(\log_2 S)$ represents a minimum integer greater than or equal to $\log_2 S$.

7. A method for improving compatibility, comprising:
   presetting a plurality of sets of initialization codes in software, wherein each set of initialization codes corresponds to one kind of slave configuration (3) of at least one manufacturer;
   obtaining parameter information of each kind of slave configuration (3) by:
   electrically connecting one General Purpose Input/Output (GPIO) pin (2) of a master configuration (1) to at least one kind of slave configuration (3);
   the master configuration (1) pulling a signal line down from an initial high level for (R+Y) clock cycles as a ready-to-send marker; or, the master configuration (1) pulling a signal line up from an initial low level for (R+Y) clock cycles as a ready-to-send marker, wherein R and Y are both positive integers, wherein the value of R is related to a number N of the kinds of the slave configurations (3), and a relationship between R and N is as follows:

$$R=L(\log_2 N)+1;$$

wherein $L(\log_2 N)$ represents a minimum integer greater than or equal to $\log_2 N$, and wherein the value of Y is related to a maximum value X of manufacturer quantities of various kinds of the slave configurations, and a relationship between Y and X is as follows:

$$Y=L(\log_2 X)+1;$$

wherein $L(\log_2 X)$ represents a minimum integer greater than or equal to $\log_2 X$;

said master configuration (1) sending a mock address to the slave configuration (3) through the GPIO pin (2);

said slave configuration (3) receiving said mock address and comparing said mock address with its native address, and if the mock address matches the native address, the slave configuration (3) sends its parameter information to the master configuration (1); and calling corresponding initialization code in the software according to the parameter information.

8. The method according to claim 7, wherein data bits of the mock address are (R−1) bits.

9. The method according to claim 7, wherein before the slave configuration (3) sends its parameter information to the master configuration (1), the method further comprises:

the slave configuration (3) sending R bits of 0 or 1 to the master configuration (1) as a ready-to-feedback marker.

10. The method according to claim 7, wherein before the master configuration (1) pulls the signal line down from the initial high level for (R+Y) clock cycles as the ready-to-send marker, the method further comprises: the master configuration (1) setting the GPIO pin (2) to an output state and making it to output a high level; or before the master configuration (1) pulls the signal line up from the initial low level for (R+Y) clock cycles as the ready-to-send marker, the method further comprises: the master configuration (1) setting the GPIO pin (2) to an output state and making it to output a low level.

11. The method according to claim 7, wherein the parameter information is a manufacturer ID number; and data bits of said manufacturer ID number have V bits, and the value of V is related to manufacturer quantity S of this kind of slave configuration (3), and a relationship between V and S is as follows:

$$V=L(\log_2 S);$$

wherein $L(\log_2 S)$ represents a minimum integer greater than or equal to $\log_2 S$.

12. An electronic device, comprising:

a master configuration (1) having at least one General Purpose Input/Output (GPIO) pin (2); and at least one kind of slave configuration (3), wherein each of the slave configuration (3) is electrically connected to one and the same of the GPIO pin (2), and the master configuration (1) is further configured to:

pull a signal line down from an initial high level for (R+Y) clock cycles as a ready-to-send marker; or pull a signal line up from an initial low level for (R+Y) clock cycles as a ready-to-send marker; and wherein, R and Y are both positive integers, the value of R is related to a number N of the kinds of the slave configurations (3), and a relationship between R and N is as follows:

$$R=L(\log_2 N)+1;$$

wherein $L(\log_2 N)$ represents a minimum integer greater than or equal to $\log_2 N$; and the value of Y is related to a maximum value X of manufacturer quantities of various kinds of the slave configurations, and a relationship between Y and X is as follows:

$$Y=L(\log_2 X)+1;$$

wherein $L(\log_2 X)$ represents a minimum integer greater than or equal to $\log_2 X$, wherein the master configuration (1) is configured to send a mock address to said at least one kind of slave configuration (3) through the GPIO pin (2); and said at least one kind of slave configuration (3) is configured to receive said mock address and compare said mock address with its native address, and if the mock address matches the native address, the slave configuration (3) sends its parameter information to the master configuration (1);

said master configuration (1) is further configured to call corresponding initialization code in software according to the received parameter information, wherein a plurality of sets of initialization codes is preset in the software and each set of initialization codes corresponds to one kind of slave configuration (3) of at least one manufacturer.

13. The electronic device according to claim 12, wherein data bits of the mock address are (R−1) bits.

14. The electronic device according to claim 12, wherein before the slave configuration (3) sends its parameter information to the master configuration (1), the slave configuration (3) is further configured to send R bits of 0 or 1 to the master configuration (1) as a ready-to-feedback marker.

15. The electronic device according to claim 12, wherein before the master configuration (1) pulls the signal line down from the initial high level for (R+Y) clock cycles as the ready-to-send marker, the master configuration (1) is further configured to set the GPIO pin (2) to an output state and making it to output a high level; or before the master configuration (1) pulls the signal line up from the initial low level for (R+Y) clock cycles as the ready-to-send marker, the master configuration (1) is further configured to set the GPIO pin (2) to an output state and making it to output a low level.

* * * * *